United States Patent [19]

Milin et al.

[11] 3,859,852

[45] Jan. 14, 1975

[54] FLUID FLOW MEASURING DEVICE

[76] Inventors: Biljana Bicky Milin; Ivan Milin, both of 149 Pacific Ave., Toronto 9, Ontario, Canada

[22] Filed: May 29, 1973

[21] Appl. No.: 364,916

Related U.S. Application Data

[63] Continuation-in-part of Ser. No. 347,672, April 4, 1973.

[30] Foreign Application Priority Data
Apr. 18, 1972 Great Britain ............... 17833/72
Apr. 2, 1973 Canada ....................... 167720

[52] U.S. Cl. ............................................. 73/204
[51] Int. Cl. ........................ G01f 1/00, G01p 5/10
[58] Field of Search ................................. 73/204

[56] References Cited
UNITED STATES PATENTS

| | | | |
|---|---|---|---|
| 2,800,018 | 7/1957 | Phillips et al. | 73/204 |
| 3,359,797 | 12/1967 | Preller | 73/204 |
| 3,400,582 | 9/1968 | Warner | 73/204 |

*Primary Examiner*—Herbert Goldstein
*Attorney, Agent, or Firm*—Westell & Hanley

[57] ABSTRACT

A method and apparatus for measuring the volume rate of gaseous fluid flow in a given cross-section of a duct. In measuring the flow in a duct, a varistor is connected with an electrical power source, the varistor is moved at a constant velocity and the total amount of the electric current is measured. In measuring the flow emanating from a duct outlet a plurality of varistors are connected in parallel and with a power source and the varistors are moved at a constant velocity across the mouth of the duct.

19 Claims, 6 Drawing Figures

FLUID FLOW MEASURING DEVICE

This is a continuation-in-part of U.S. Pat. Application Ser. No. 347,672 filed Apr. 4, 1973 by Biljana Bicky Milin and Ivan Milin.

The present invention relates to the measurement of the volume rate of gaseous fluid flow in a duct or emanating from a duct.

One method of indirectly measuring the volume rate of gaseous fluid flow (quantity per unit time, for example cubic feet per minute) is by the use of an electrical device having a temperature sensitive varistor (a resistor with an ohmic value which varies with temperature change) such as platinum. To measure the speed of gaseous fluid flow in a duct, a number of apertures are provided in a cross-sectional plane of the duct wall and a varistor probe, connected across a power source, is inserted into the flow stream to give different electrical measurements for different zones of the cross-sectional area. These measurements are proportional to the speed of fluid flow (length per unit time) in the duct and when added together and translated they give the total average speed flow of the fluid through the tested cross-sectional area of the duct. By multiplying the area of the duct by the average speed of the fluid the rate of flow may be determined. This method is slow and relatively inaccurate.

One way to measure the rate of gaseous fluid flow emanating from a duct is to place a conduit against the outlet of the duct and carry out the procedure mentioned above, measuring different zones of the cross-sectional area of the conduit.

It is an object of the present invention to provide a method of directly measuring the volume rate of gaseous fluid flow in or from a duct.

It is a further object of the invention to provide apparatus for the direct measurement of such volume rate of flow in a duct.

It is another object of the invention to provide apparatus for the direct measurement of such volume rate of flow from a duct.

Example embodiments of the invention are shown in the accompanying drawings in which.

Figure 1:
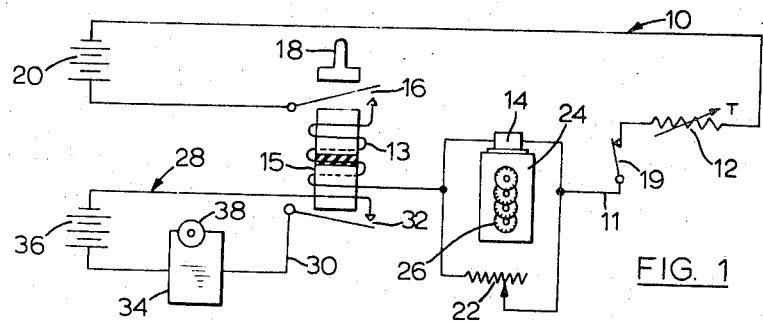
FIG. 1 is a schematic diagram of an electrical circuit of a fluid flow measuring device.
Figure 2:
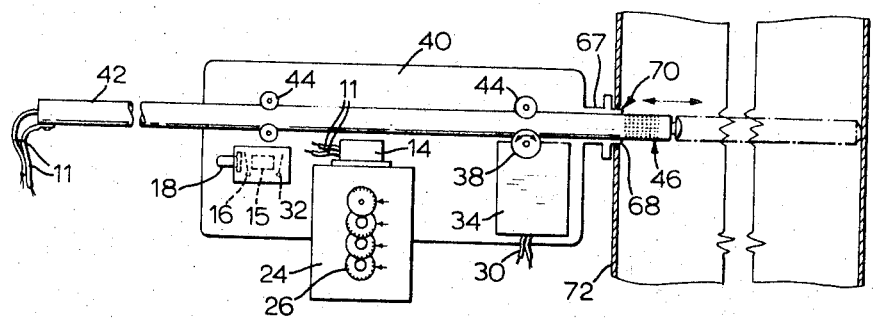
FIG. 2 is a side view of a device incorporating the circuit shown in FIG. 1 and showing its relationship in a duct.
Figure 3:
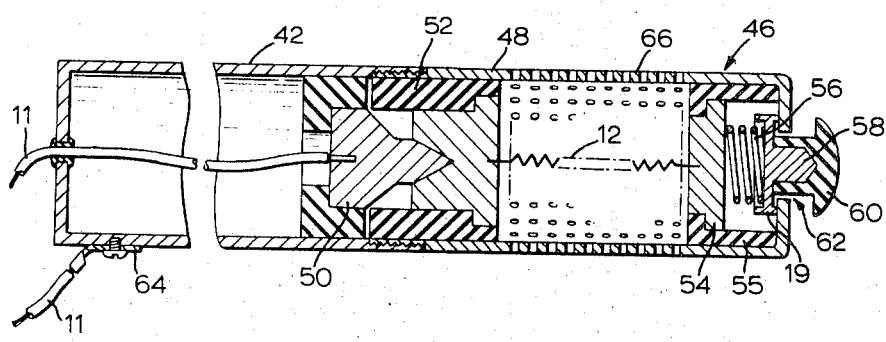
FIG. 3 is a cross-sectional view of the probe of the device shown in FIG. 2.

As seen in FIG. 1 of the drawings, the example embodiment of FIGS. 1-3 for measuring gaseous fluid flow within a duct consists of a first electrical circuit 10 having a line 11 connecting in series a varistor 12, an electric motor 14, a winding 13 on an inductance core 15, a normally open contact switch 16 manually actuable by a push button 18, a normally closed switch 19, and a direct current electrical power source 20. A variable resistor 22 is connected in parallel with motor 14 which is also mechanically connected through a gear box 24 with a plurality of rotatable indicator dials 26.

A second electrical circuit 28 comprises a line 30 connecting in series a normally open contact switch 32 actuable by inductance core 15, an electric drive motor 34 and a direct current electrical power source 36. Motor 34 is mechanically connected with a drive wheel 38.

In FIG. 2 of the drawings the elements of FIG. 1 except for power sources 20 and 36 are all mounted on a body member 40 which may be in the shape of a pistol. A shaft 42 is mounted on a plurality of guide rollers 44 journally mounted on body member 40 and in suitable frictional contact with drive roller 38 of motor 34. As seen in FIG. 3, shaft 42 carries a probe 46 at one end which contains varistor 12 in a hollow cylindrical holder 48. Line 11 is connected to one end of varistor 12 through a connector 50 which is fixed in shaft 42 and holder 48 on an insulating mount 52. The other end of varistor 12 is connected with holder 48, through a connector 54 which is fixed in the holder on an insulating mount 55, by means of a conductive compression spring 56 urging a button 58 against the holder to form normally closed limit switch 19. Button 58 carries an insulating tip 60 which projects through an aperture 62 in the end of holder 48. Both shaft 42 and holder 48 are conductors and line 11 is connected to the outer surface of shaft 42 by a suitable connector 64. That portion of holder 48 circumscribing varistor 12, which is suspended between connectors 50 and 54, is perforated to form a cylindrical screen 66. Body member 40 carries a hollow guide member 67 accommodating shaft 42 and having a flanged free end 68 adapted to fit into an aperture 70 in the side of a duct 72 while the guide member bears against the side of the duct.

In the operation of this example embodiment, probe 46 is inserted through aperture 70 in the side of duct 72 in which the flow of gaseous fluid is to be measured. Push button 18 is then pressed to close contact 16 which completes circuit 10, actuates motor 14 to rotate dials 26, and heats varistor 12. The closing of contact 16 automatically closes contact 32 to complete circuit 28, thus actuating drive motor 34 at the same time as varistor 12 is heated and motor 14 is actuated. Motor 34 drives shaft 42 through drive wheel 38 and moves probe 46 across the interior of duct 72 at a constant velocity. When tip 60 of probe 46 reaches and bears against the far side of duct 72 opposite aperture 70, the pressure depresses button 59 against the action of compression spring 56 and opens switch 19 which opens circuit 10 and disconnects power source 20 from motor 14, stopping the advance of dials 26 and causing contacts 16 and 32 to open. The opening of contact 32 disconnects drive motor 34 from power source 36 and stops the advance of shaft 42 and probe 46.

Varistor 12 is first chosen to have its resistance vary in linear proportion to its temperature and it is then adjusted to have its temperature vary in linear proportion to the speed of fluid flow in duct 72. This may be done by adjusting screen 66, by changing the size and shape of the varistor, by changing the voltage of power source 20, and by varying resistor 22.

As probe 46 advances across the interior of duct 72 gaseous fluid passes through screen 66 to affect the temperature of varistor 12 and hence its resistance, which in turn affects the speed of motor 14. Thus the speed of motor 14 is proportional to the speed of gaseous fluid flow in duct 72. By suitably calibrating dials 26 a total reading of the volume rate of gaseous fluid flow in duct 72 may be obtained by relating the final dial reading to a suitable chart, given the duct size and shape and a multiplier constant.

Resistance 22 is optional and may be varied to adjust the device for different varistors, as when different probes are used for different shapes of ducts. Compensation over a wide range of fluid flow velocities may also be accomplished by changing the size of the apertures in screen 66, for instance by replacing probe 46 with a probe having a screen of a different size or a different varistor, or by using a sliding sleeve on housing 48 to block off some of the apertures in the screen.

For measuring the rate of flow in a larger duct, the duct may be divided into imaginary parallel channels each of a width for which the device of the invention is calibrated, and each channel is measured by the device as outlined above. The device will give an end reading which is proportional to the total fluid flow in the duct because it is the sum of the individual measurements.

The varistor described above is defined as an electrically heated resistance element in which the resistance increases as the temperature increases. Thus in a portion of the cross-sectional area of duct 72 where the fluid flow is greater the flow will cool varistor 12 more rapidly, causing the resistance of the varistor to decrease and causing the current in circuit 10 to increase, the voltage of power source 20 being constant. This increased current drives motor 14 faster and increases the accumulated reading on dials 26. Where the flow in the duct decreases the opposite effect will occur on dials 26. In this manner the device of the invention will integrate the flow in the duct and the total value will be indicated by the movement of dials 26 which can be interpreted according to the above-mentioned parameters.

Figure 4:
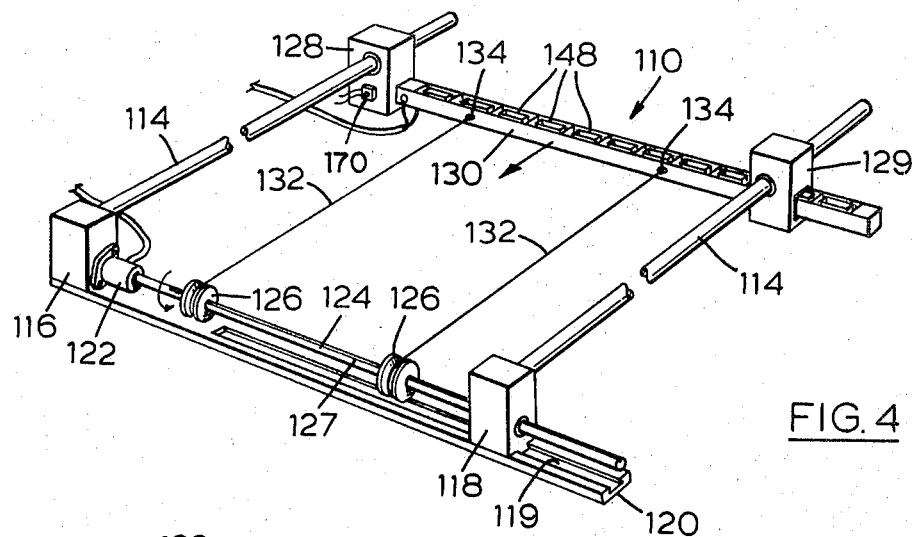
FIG. 4 is a perspective view of a device for measuring the rate of gaseous fluid flowing out of a duct.
Figure 5:
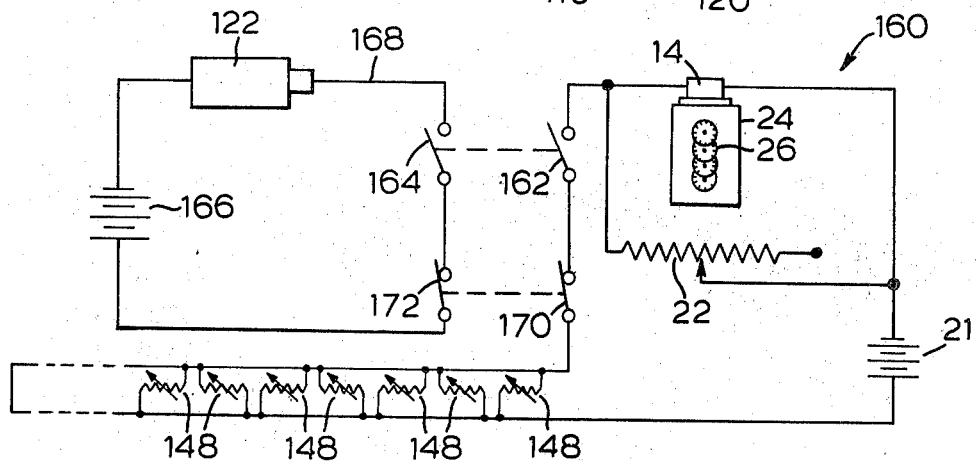
FIG. 5 is a schematic diagram of an electrical circuit for the device of FIG. 4.
Figure 6:
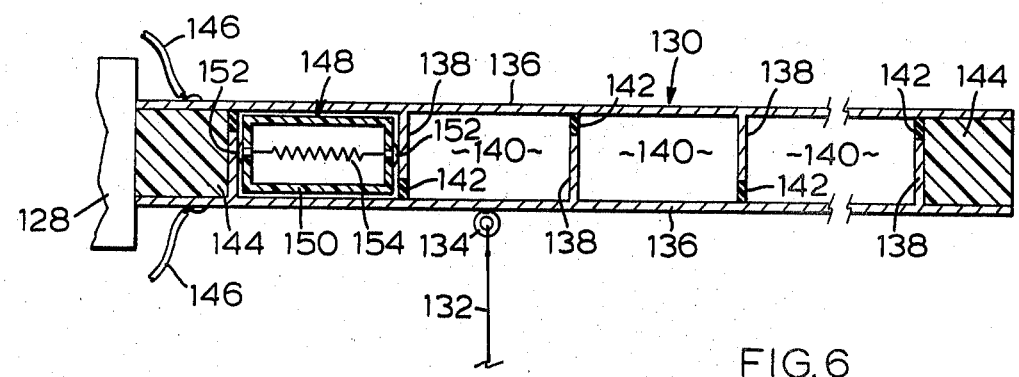
FIG. 6 is a plan view of the varistor holder of the device of FIG. 4.

FIGS. 4, 5, and 6 show the use of the invention for measuring gaseous fluid flow emanating from the outlet of a duct. The example embodiment shown in FIGS. 4, 5 and 6 comprises a frame 110 having a pair of parallel bars 114 terminating in a pair of spaced blocks 116 and 118. Block 118 is slidable in a slot 119 in a connecting plate 120. A constant speed electric motor 122 is mounted on block 116 and rotatably supports one end of a shaft 124 which is axially slidable at its other end in block 118 and freely rotatable in the block. A pair of spaced spools 126 are slidably keyed in a slot 127 on shaft 124. A further pair of blocks 128 and 129 are mounted for sliding movement along bars 114 and a holder 130 extends between them, being fixed to block 128 and slidable in block 129.

A pair of flexible strands 132 are wound on spools 126 and the free ends of the strands are attached to a pair of spaced eyes 134 fixed on holder 130.

Holder 130 comprises a pair of parallel strips 136 interconnected by equally spaced dividers 138 to form a row of compartments 140. Strips 136 and dividers 138 are electrically conductive and one end of each divider has an insulating segment 142 where it joins one of the strips, the segments alternately joining the dividers with one or the other of the strips, as seen in FIG. 6. Each end of holder 130 carries an insulating filler 144 and one end of the holder carries a pair of electrical leads 146 one attached to each strip 130. A plurality of varistor cells 148 are insertable one into each compartment 140 of holder 130. Each cell 148 consists of a box 150 of insulating material with a contact 152 projecting from each end of the box and positioned to contact opposing dividers 138 when the cell is press-fitted into a compartment 140. A varistor 154 in box 150 of cell 148 interconnects contacts 152.

FIG. 5 shows an electrical circuit 160 comprising a plurality of varistor cells 148 connected in parallel with an electric motor 14 and a direct current electrical power source 21. As in the previous embodiment, a variable resistor 22 is connected in parallel with motor 14 which is also mechanically connected through a gear box 24 with a plurality of rotatable indicator dials 26. A normally open switch 162 is connected in series with motor 14 in circuit 160. Switch 162 is ganged with a normally open switch 164 which is connected in series with motor 122 and a direct current electrical power source 166 in a circuit 168. A normally closed limit switch 170 is mounted on block 128 and arranged to be opened when block 128 reaches block 116. Switch 170 is connected in series with motor 14 in circuit 160 and it is ganged with a normally closed switch 172 connected in series with motor 122 in circuit 168.

In the operation of the example embodiment of FIGS. 4-6, frame 110 is placed to circumscribe the duct outlet, usually against a wall in which the outlet is located. A plurality of varistor cells 148 are inserted into compartments 140 whereby the duct outlet is spanned by filled compartments when holder 130 is passed laterally across the outlet. An excess of cells 148 passing laterally outside the perimeter of the duct outlet will not normally affect the flow reading adversely. When cells 148 are in place in holder 130 and the frame is in place on the duct, outlet switch 164 is closed to actuate motor 122 and draw holder 130 at a constant velocity across the mouth of the duct. Closing switch 164 also closes switch 162 which actuates motor 14. When block 128 reaches block 116, limit switch 170 is opened which also opens switch 172, breaking circuits 160 and 168. Dial 26 is then read as before. Resistor 22 is set according to the number of varistor cells 148 in circuit 160 to keep the current through motor 14 within prescribed limits.

It will be appreciated that motor 14 may be chosen to operate only at a predetermined minimum current which will be achieved when the resistance of varistor 12 or 154 is lowered. Alternatively, solenoid 15 may be chosen to close only at a predetermined minimum current. In any event, in most cases the current in circuit 10 or 160 is greatly increased when varistor 12 or 154 is positioned in the gaseous flow of the duct and any current reading on dials 26 when the varistor is not in the fluid flow stream would be negligible.

I claim:

1. A method of measuring the volume rate of gaseous fluid flow in a given cross-section of a duct, comprising the steps of:
    connecting a varistor in series with an electrical power source;
    moving the varistor a predetermined distance and at a predetermined velocity transversely through the given cross-section of the duct in a linear path; and
    measuring the total amount of the electric current during the travel of the varistor.

2. A method as claimed in claim 1 in which the varistor is connected in series with rotary electric motor means and the rotation of the motor means in measured to determine the total electric current.

3. A method as claimed in claim 1 in which simultaneously the varistor is connected with the electrical power source and movement of the varistor is initiated.

4. A method as claimed in claim 1 in which the electrical power source is a direct current power source.

5. Apparatus for measuring the volume rate of gaseous fluid flow in a given cross-section of a duct, comprising:

a varistor;

means to move the varistor a predetermined distance and at a predetermined velocity transversely through the given cross-section of the duct in a linear path;

means to connect the varistor in series with an electrical power source; and means connectable electrically in series with the varistor for measuring the total amount of electric current during the travel of the varistor when connected with the power source.

6. Apparatus as claimed in claim 5 including means to simultaneously actuate the means to move the varistor and the means to connect the varistor with the electrical power source.

7. Apparatus as claimed in claim 6 in which the means to move the varistor comprises electric motor means connectable to an electrical power source.

8. Apparatus as claimed in claim 7 in which the means to connect the varistor with the electrical power source and the electric motor means are connected to a normally open solenoid switch for common operation.

9. Apparatus as claimed in claim 5 in which the total electric current measuring means comprises rotary electric motor means.

10. Apparatus as claimed in claim 9 in which the means to measure the rotation of the electric motor means comprises at least one calibrated rotational dial interconnected with the rotor by gear means.

11. Apparatus as claimed in claim 9 including a variable resistance connected in series with the varistor and in parallel with the electric motor means.

12. Apparatus for measuring the rate of gaseous fluid flow in a duct, comprising:

a probe having an apertured holder and a varistor mounted in the holder, the varistor being connectable in series with an electrical power source;

electric current measuring means connected electrically in series with the varistor and in series with a normally open switch whereby the total electric current passing through the varistor is measurable; and means to move the probe at a predetermined velocity across the duct responsive to the closing of the switch and to stop the movement of the probe upon the opening of the switch.

13. Apparatus as claimed in claim 12 in which the electric current measuring means comprises an electric motor having rotational dial means geared to the rotor thereof.

14. Apparatus as claimed in claim 12 in which the probe carries a limit switch connectable in series with the varistor actuable to stop the probe.

15. Apparatus for measuring the volume rate of gaseous fluid flow emanating from a duct outlet comprising:

a frame constructed and arranged to circumscribe the duct outlet when placed thereagainst;

at least one varistor mounted movably on the frame for movement across the duct outlet and connectable in series with an electrical power source;

electric current measuring means connected electrically in series with the varistor and in series with a normally open switch whereby the total electric current passing through the varistor is measurable; and means to move the varistor on the frame at a predetermined velocity responsive to the closing of the switch and to stop the movement of the probe upon the opening of the switch.

16. Apparatus as claimed in claim 15 in which a plurality of varistors are mounted in a row on the frame, the varistors being electrically connected in parallel one with another.

17. Apparatus as claimed in claim 16 including a variable resistor electrically connected in parallel with the motor means.

18. Apparatus as claimed in claim 16 in which the frame includes an elongated holder movable transversely, the varistors being individually insertable and removable in the holder.

19. Apparatus as claimed in claim 15 in which the electric current measuring means comprises an electric motor having rotational dial means geared to the rotor thereof.

* * * * *